(12) United States Patent
Monden

(10) Patent No.: US 9,430,815 B2
(45) Date of Patent: Aug. 30, 2016

(54) IMAGE CORRECTION SYSTEM, IMAGE CORRECTION METHOD, AND PROGRAM RECORDING MEDIUM

(71) Applicant: NEC Corporation, Minato-ku, Tokyo (JP)

(72) Inventor: Akira Monden, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/759,489

(22) PCT Filed: Jan. 17, 2014

(86) PCT No.: PCT/JP2014/000216
§ 371 (c)(1),
(2) Date: Jul. 7, 2015

(87) PCT Pub. No.: WO2014/115520
PCT Pub. Date: Jul. 31, 2014

(65) Prior Publication Data
US 2015/0371371 A1    Dec. 24, 2015

(30) Foreign Application Priority Data
Jan. 22, 2013   (JP) ................................ 2013-008902

(51) Int. Cl.
| | |
|---|---|
| *G06K 9/00* | (2006.01) |
| *G06T 5/00* | (2006.01) |
| *G06T 3/40* | (2006.01) |
| *G06K 9/46* | (2006.01) |
| *G06K 9/52* | (2006.01) |
| *H04N 5/357* | (2011.01) |
| *G06T 5/40* | (2006.01) |

(52) U.S. Cl.
CPC ............... *G06T 5/00* (2013.01); *G06K 9/4642* (2013.01); *G06K 9/52* (2013.01); *G06T 3/40* (2013.01); *G06T 5/008* (2013.01); *G06T 5/40* (2013.01);
(Continued)

(58) Field of Classification Search
USPC ....... 382/168, 266, 275, 199, 171, 190, 254, 382/174, 274; 345/426; 348/208.4, 222.1, 348/254, 297
See application file for complete search history.

(56) References Cited

U.S. PATENT DOCUMENTS 7,447,378 B2 * 11/2008 Kondo .................... G06T 3/403
348/254
7,593,594 B2 *  9/2009 Kondo ................. G06K 9/4609
348/208.4

FOREIGN PATENT DOCUMENTS

| JP | S62-122376 A | 6/1987 |
| JP | H06-169377 A | 6/1994 |

(Continued)

OTHER PUBLICATIONS

International Search Report for PCT Application No. PCT/JP2014/000216, mailed on Apr. 22, 2014.
(Continued)

*Primary Examiner* — Anh Do

(57) ABSTRACT

This image correction system corrects image data from pixels, is connected to at least two different input pathways, and is provided with: a pixel value relationship extraction means that extracts the pixel value relationship among neighboring pixels from image data that is the subject of correction; a pixel value relational expression estimation means that estimates a relational expression representing the difference in characteristics in each pixel from the pixel value relationship between neighboring pixels; and a pixel value correction means that forms a corrected image by correcting the pixel values of the image data that is the subject of correction using the relational expression.

10 Claims, 18 Drawing Sheets

(52) U.S. Cl.
CPC ..... *H04N 5/357* (2013.01); *G06T 2207/10032* (2013.01)

(56) References Cited

FOREIGN PATENT DOCUMENTS

| JP | H08-111776 A | 4/1996 |
|---|---|---|
| JP | H11-275321 A | 10/1999 |
| JP | 2000-307859 A | 11/2000 |
| JP | 2001-211297 A | 8/2001 |
| JP | 2005-080016 A | 3/2005 |

OTHER PUBLICATIONS

English translation of Written opinion for PCT Application No. PCT/JP2014/000216.

\* cited by examiner

Fig. 10

| (2n,1) | (2n,2) | ⋮ | (2n,k) | ⋯ |
| (2n−1,1) | (2n−1,2) | ⋮ | (2n−1,k) | ⋯ |
| ⋮ | ⋮ | ⋮ | ⋮ | ⋮ |
| (2,1) | (2,2) | ⋮ | (2,k) | ⋯ |
| (1,1) | (1,2) | ⋮ | (1,k) | ⋯ |

IMAGE CORRECTION SYSTEM, IMAGE CORRECTION METHOD, AND PROGRAM RECORDING MEDIUM

This application is a National Stage Entry of PCT/JP2014/000216 filed on Jan. 17, 2014, which claims priority from Japanese Patent Application 2013-008902 filed on Jan. 22, 2013, the contents of all of which are incorporated herein by reference, in their entirety.

TECHNICAL FIELD

The present invention relates to an image correction system, an image correction method, and an image correction program which perform correction such that, in an image having a plurality of pixels having different characteristics, all pixels will have the same characteristic by correcting a characteristic of each pixel.

BACKGROUND ART

It has been widely practiced that an input device is configured with a plurality of circuits in response to a demand for higher resolution to an image input device such as a digital camera, an image scanner in a copier, and an image sensor of a camera which captures from a satellite and an aircraft.

For example, a resolution may be doubled by arranging two rows of CCD sensors with one row being shifted by a half pixel (CCD: Charge Coupled Device). In addition, in a line sensor to obtain a two-dimensional image by scanning using a row of sensors, it is possible to halve the time required for reading by using separate reading circuits for even pixels and odd pixels. As a result, it is possible to double the resolution in the scan direction since the time required for reading one pixel in the scan direction can be halved.

Thus, it is possible to improve resolution by configuring an input device with a plurality of circuits. However, when configuring an input device with a plurality of circuits, a characteristic difference among the circuits becomes a problem.

Even though input/output characteristics of circuits are typically different for each circuit, output pixel values are different for each circuit even when points of the same brightness are captured. Therefore, for example, in a case of an image which is obtained by being captured with different circuits for even pixels and odd pixels, luminance values indicating the brightness of even pixels and odd pixels result in being different. As a result, image quality deteriorates because vertical stripes will be included in the image due to a difference of luminance values between even pixels and odd pixels.

In order to prevent such image quality deterioration, correction is required in consideration of the input-output characteristic of each circuit. In general, when the input-output characteristic of each circuit is known and fixed, it is performed that a value of each pixel is corrected by a correction expression determined in advance.

However, in practice, there is a case in which the circuit characteristic changes for each capturing due to effects of a temperature of the circuit and the like at a time of capturing. When the circuit characteristic changes for each capturing, correction corresponding to an input image is required since the correction expression cannot be obtained in advance.

In PTL 1, an image reading device corresponds to a case that a circuit characteristic changes for each capturing is disclosed. First, before reading image information, a gray scale in which a concentration changes linearly is read and the concentration of the gray scale and an output concentration values of even bits and odd bits at a time of actually reading the concentration are stored respectively for the even bits and the odd bits. Subsequently, image information read by CCD is corrected by proper concentration values for the respective even bits and odd bits. A signal of the corrected even bits and odd bits is composed to be output. In the image reading device in PTL 1, a characteristic difference of linearity of the odd bits and even bits can be eliminated. The image reading device described in PTL 1 is appropriate for applications in which the capturing location is fixed such as an image scanner since concentration correction is performed using a gray scale provided in a reading area.

In PTL 2, an image reading device in which a gray scale for correction in PTL 1 and the like are not required is disclosed. In the image reading device in PTL 2, when a luminance value (pixel data) is smaller than a predetermined value and a difference from an adjacent pixel is greater than a predetermined value, a value obtained by averaging with the adjacent pixel is used and otherwise the original luminance value is used as is. Thereby, a difference between an odd pixel and an even pixel with a small luminance value is eliminated.

CITATION LIST

Patent Literature

[PTL 1] Japanese Laid-open Patent Publication No. H06-169377
[PTL 2] Japanese Laid-open Patent Publication No. 2000-307859

SUMMARY OF INVENTION

Technical Problem

In the image reading device in PTL 1, there is a problem that it is difficult to capture any capturing target at any location. The reason is that, although it is possible to provide a gay scale and the like when a capturing location is fixed in such a case as the image reading device of PTL 1, it is difficult to arrange a gray scale and the like when capturing any capturing target at any location.

In the image reading device in PTL 2, there is a problem that image quality is deteriorated due to blur and the like generated in the image since the original pixel values cannot be restored. The reason is that, by correcting using the average value among the adjacent pixels, for example, in such a case that the image includes a signal of two pixel periods, the signal disappears by averaging with the adjacent pixel.

Furthermore, in the image reading device in PTL 2, there is a problem that stripes remain in an output image since an image of an area with large luminance values is not corrected. The reason is that correction targets are limited to areas where luminance values are small.

An object of the present invention is to provide an image correction system, an image correction method, and an image correction program which solve the problems described above.

Solution to Problem

An image correction system of the present invention for correcting image data from pixels connected to at least two different input paths includes an input means for inputting image data of a correction target; a pixel value relationship extraction means for extracting a relationship of pixel values among adjacent pixels from the image data of the correction target; a pixel value relational expression estimation means for estimating a relational expression representing a characteristic difference at each pixel from the relationship of the pixel values among the adjacent pixels; a pixel value correction means for generating a correction image by correcting pixel values of the image data of the correction target using the relational expression; and an output means for outputting the correction image.

An image correction method of the present invention is the image correction method for correcting image data from pixels connected to at least two different input paths, wherein data of a correction target is input; a relationship of pixel values among adjacent pixels is extracted from the image data of the correction target; a relational expression representing a characteristic difference at each pixel is estimated from the relationship of the pixel values among the adjacent pixels; a correction image is generated by correcting the pixel values of the image data of the correction target using the relational expression; and the correction image is output.

An image correction program of the present invention is the image correction program for correcting image data from pixels connected to at least two different input paths, wherein the image correction program causes a computer to execute: a process for inputting image data of a correction target; a process for extracting a relationship of pixel values among adjacent pixels from the image data of the correction target; a process for estimating a relational expression representing a characteristic difference at each pixel from the relationship of the pixel values among the adjacent pixels; a process for generating a correction image by correcting the pixel values of the image data of the correction target using the relational expression; and a process for outputting the correction image.

Advantageous Effects of Invention

According to the present invention, it is possible to obtain a homogeneous output image by eliminating characteristic differences of all pixels by means of correcting a characteristic of each pixel for any image having a plurality of pixels having different characteristics.

BRIEF DESCRIPTION OF DRAWINGS

FIG. 10 is a diagram illustrating an example of pixel numbers of CCD sensors according to an example of the present invention.

DESCRIPTION OF EMBODIMENTS

Figure 1:
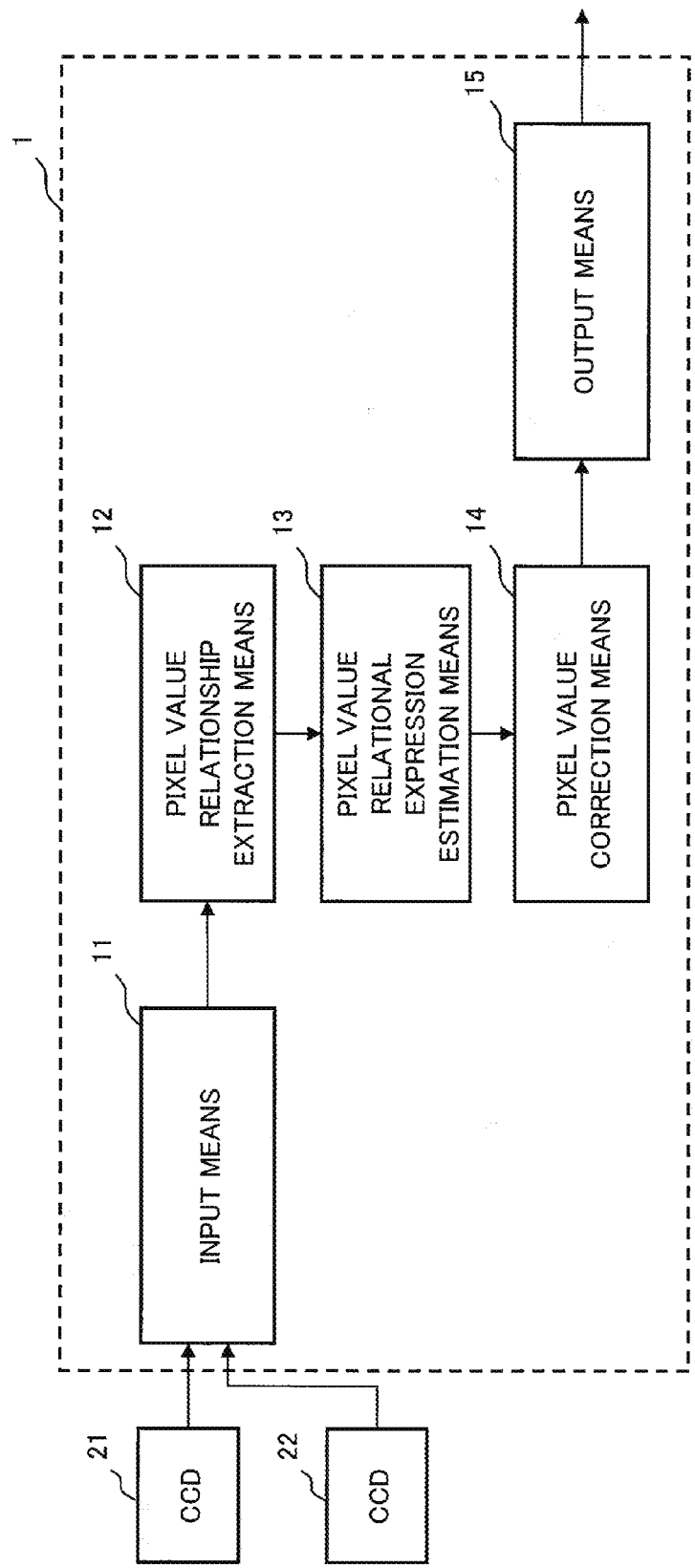
FIG. 1 is a block diagram illustrating a configuration of an image correction system according to a first exemplary embodiment of the present invention.

Hereinafter, exemplary embodiments for implementing the present invention will be explained with reference to the drawings. However, in the exemplary embodiments and examples described below, technically preferred limits are set for carrying out the present invention, but the scope of the invention is not limited to the following.

First Exemplary Embodiment

First, a configuration of a first exemplary embodiment will be explained with reference to FIG. 1.
{Configuration}
Referring to FIG. 1, an image correction system 1 according to the first exemplary embodiment of the present invention includes an input means 11, a pixel value relationship extraction means 12, a pixel value relational expression estimation means 13, a pixel value correction means 14, and an output means 15.
(Input Means)
The input means 11 inputs image data of a correction target.

Image data input by the input means 11 is, for example, data obtained from a solid-state imaging element using a CCD or a CMOS and the like (CCD: Charge Coupled Device, CMOS: Complementary Metal Oxide Semiconductor).

In FIG. 1, as a configuration for inputting signals from pixels connected to different input paths to the input means 11, a configuration in which a CCD 21 and a CCD 22 are the origins is illustrated. Note that, in FIG. 1, it is illustrated such that signals originated from the CCD 21 and the CCD 22 are input but it is sufficient if a configuration is such that at least two signals with different input paths are input to the input means 11. Furthermore, when signals are input from an input device constituted by a plurality of circuits, signals affected by an input-output characteristic of each circuit are input to the input means 11. In addition, signals from pixels connected to different input paths may have three or more characteristics.

Note that a solid-state imaging element for obtaining image data is not limited to a CCD or a CMOS and may be a configuration for obtaining data about an image by arranging sensors such as bolometers in an array. It may also be configured to obtain not only image data acquired newly but also image data stored in a recording medium such as a memory or a hard disc of a computer. For example, an input means for inputting image information whose data is received via wireless communication to a computer capable of executing a process of the image correction system of the present exemplary embodiment may be used. Furthermore, for example, it is possible to use any of input means for directly inputting from image sensors, inputting via a physical medium such as a memory card and a CD, or the like (CD: Compact Disc).

Image information obtained by a solid-state imaging element may be, for example, converted to image data by being amplified by an amplifier, being converted to a digital signal from an analogue signal, and being performed with shading correction by a shading correction circuit. Note that image data obtained by the input means 11 does not need to be obtained by the means described above and may be a configuration in which image information arranged in an array is captured in the order of its processing.

In the exemplary embodiments of the present invention, it is assumed that there are two or more types of pixels having different characteristics. For example, when there are two types of pixels having different characteristics, a row formed by pixels arranged in an array may be arranged such that the row is shifted from a row adjacent to that row by one half of a pixel. When there are three types of pixels having different characteristics, a row formed by pixels arranged in an array may be arranged such that a row adjacent to that row is shifted by one third of a pixel.

Although it is assumed in the present exemplary embodiment that two CCDs are arranged with one half of a pixel shifted, a sensor having two read circuits, each for even and odd, in one CCD also becomes a sensor having different input-output characteristics for even pixels and odd pixels.

(Pixel Value Relationship Extraction Means)

The pixel value relationship extraction means 12 extracts a relationship of pixel values among adjacent pixels from image data of a correction target input by the input means 11. Note that, when it is determined from the extracted relationship of the pixel values among adjacent pixels that characteristics of at least two signals whose input paths are different are the same, the input signals may be transmitted to the output means 15 without change.

Pixels belonging to an odd column and an even column, which are adjacent, in the same row may be selected as the adjacent pixels. Furthermore, pixels belonging to an odd row and an even row, which are adjacent, in the same column may be selected. In addition, although it is assumed in the present exemplary embodiments that characteristics are different in even columns and odd columns, it is not necessary that pixels having different characteristics are alternatingly arranged and an estimation of a pixel value relational expression may be performed using only a portion to which a pixel having a different characteristic is adjacent.

The pixel value relationship extraction means 12 extracts, for example, $[vo_0, ve_0]$ as a pixel value when a pixel value of an odd pixel $(2n-1, k)$ is $vo_0$ and a pixel value of an even pixel $(2n, k)$ is $ve_0$. Extracting the pixel value relationship from all pixels, pixel value relationships $[vo_i, ve_i]$ for the number of all even pixels are extracted. Note that a pixel value of an odd pixel may be obtained from a pixel value of an even pixel.

A pixel value may be, for example in a case of a color pixel, set to a value configured by 24 bits by representing RGB elements consisting of three primary colors of R (Red), G (Green), and B (Blue) each in eight bits. In addition, bit information about each of the RGB elements may be individually set as a pixel value. Furthermore, in a case of a monochrome image, a value representing luminance information in eight bits may be set as the pixel value. Moreover, bit information obtained by gradating temperature information, intensity of electro-magnetic waves, and the like may be set as the pixel value. Note that the pixel values according to the exemplary embodiments of the present invention are not limited to those described herein and any DN value associated with the image may be set as the pixel value (DN: Digital Number).

(Pixel Value Relational Expression Estimation Means)

The pixel value relational expression estimation means 13 estimates a relational expression of pixel values among adjacent pixels from the relationship of the pixel values among the adjacent pixels extracted by the pixel value relationship extraction means 12.

For example, having set a polynomial whose degree is known and whose coefficients are unknown, the pixel value relational expression estimation means 13 may identify the coefficients by substituting the pixel value relationships extracted by the pixel value relationship extraction means 12 for the polynomial described above to estimate the pixel value relational expression. Note that the pixel value relational expression is not necessarily a mathematical expression as long as it expresses a relationship capable of converting pixels from which the pixel value relationship has been obtained to a correction image described later.

(Pixel Value Correction Means)

The pixel value correction means 14 corrects pixel values of an image of a correction target using a pixel value relational expression estimated by the pixel value relational expression estimation means 13 to generate a correction image.

The pixel value correction means 14 can perform correction of the image data, for example, by converting pixel values of all odd pixels with the pixel value relational expression described above and by combining the converted pixel values of the odd pixels with unconverted pixel values of even pixels. In addition, even pixels instead of odd pixels may be converted with the pixel value relational expression and both of odd pixels and even pixels may be converted.

(Output Means)

The output means 15 outputs the correction image whose pixel values are corrected by the pixel value correction means 14.

The output means 15 may store the correction image in a storage means included in the image correction system 1 or may transmit it to a storage device on a network. In addition, when transmitting it to a storage device on a network, the correction image may be transmitted after a certain amount of correction image data has been accumulated by temporarily storing the correction image in the storage means included in the image correction system 1 or the converted correction image may be directly transmitted to a network.

Note that the output means 15 may perform image processing such as gamma processing, color correction, and scaling to the correction image corrected by the pixel value correction means 14. The image processing may be performed by the pixel value correction means 14 or it may be a configuration including other image processing devices.

{Operation}

Next, an operation of the image correction system 1 according to the first exemplary embodiment of the present invention will be explained with reference to a flowchart of FIG. 2.

Figure 2:
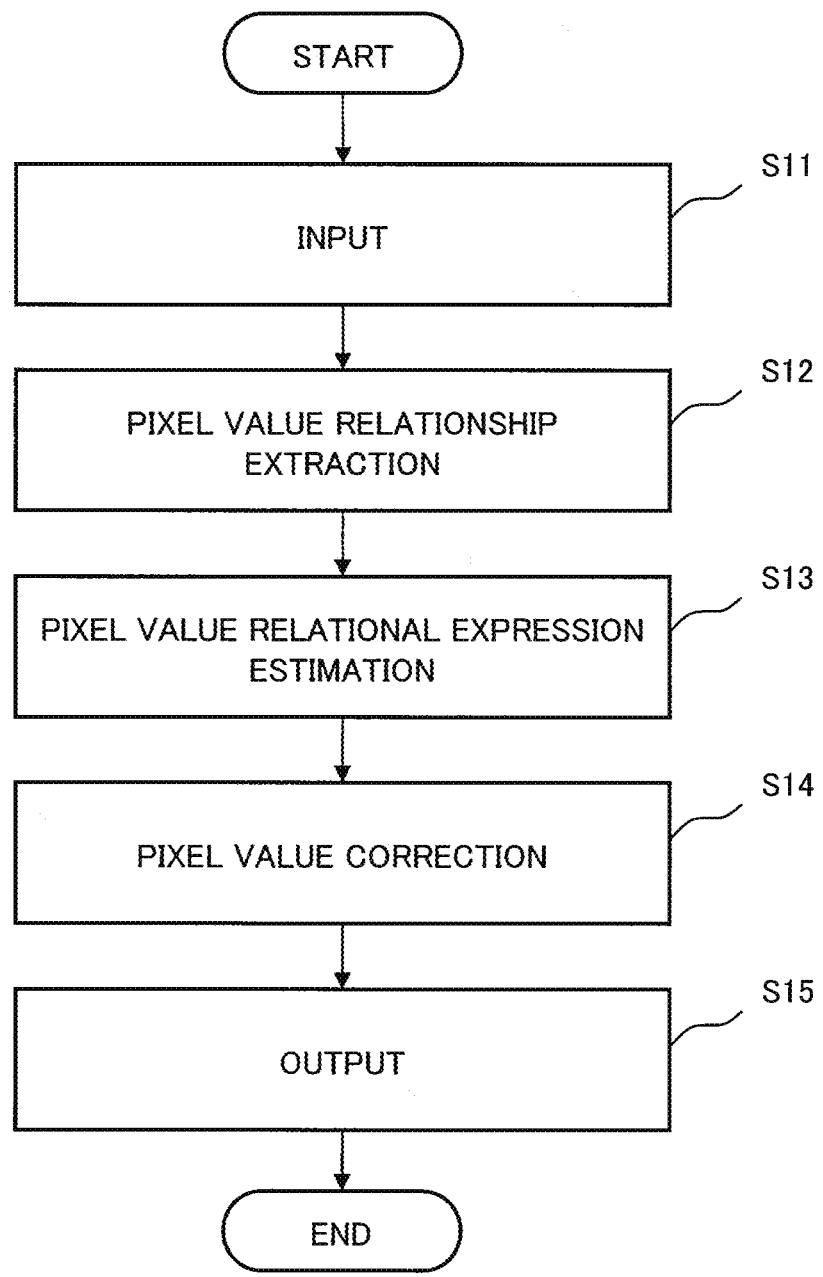
FIG. 2 is a flowchart illustrating an operation of the image correction system according to the first exemplary embodiment of the present invention.

In FIG. 2, first, the input means 11 inputs an image of a correction target (step 11).

The pixel value relationship extraction means 12 compares pixel values of adjacent pixels in the image of the correction target input by the input means 11 to extract a relationship of the pixel values among the adjacent pixels (step 12).

The pixel value relational expression estimation means 13 estimates, as a pixel value relational expression, an expression which best matches the pixel values among the adjacent pixels using the relationship of the pixel values among the adjacent pixels extracted by the pixel value relationship extraction means 12 (step 13).

The pixel value correction means 14 corrects a pixel value of each pixel of the correction target image using the pixel value relational expression estimated by the pixel value relational expression estimation means to generate a correction image (step 14).

The output means 15 outputs the correction image whose pixel values are corrected by the pixel value correction means 14 (step 15).

The above is the description of the image correction system according to the first exemplary embodiment of the present invention. It is assumed that image correction systems obtained by performing various modifications and additions to the configurations and the operations described above are also included in the scope of the present invention.

As described above, according to the image correction system according to the first exemplary embodiment of the present invention, a characteristic difference of each of an even circuit and an odd circuit is estimated from a relationship of pixel values among adjacent pixels and correction is performed based on the estimation result. Accordingly, any characteristic difference at any pixel value for any capturing target can be corrected. As a result, it is possible to eliminate characteristic differences of all pixels by correcting a characteristic of each pixel for any image having a plurality of pixels having different characteristics to obtain a homogeneous output image.

Although, in the first exemplary embodiment of the present invention, signals input from paths having two characteristics derived from odd pixels and even pixels have been illustrated, signals input from paths having three or more characteristics can be handled. For example, with regard to pixel values of a plurality of different pixels in adjacent pixel areas, pixel value relationships between different ones are respectively extracted using the method described above. Estimating pixel value relational expressions among different pixels based on the extracted pixel value relationships, a correction pixel can be generated using the pixel value relational expressions.

Comparing again the image reading device of PTL 2 and the image correction system according to the first exemplary embodiment of the present invention, it will be explained that the problem of the image reading device of PTL 2 can be solved by the image correction system according to the first exemplary embodiment of the present invention.

In the image reading device of PTL 2, the correction target is limited to pixels having small luminance values, assuming that conspicuous stripes of an even-odd difference are in dark areas. For this reason, when there is a difference by a predetermined value between even pixels and odd pixels (an even-odd difference is additive), effects of the even-odd difference become relatively small in areas having large luminance values and the darker the area becomes, the more conspicuous the even-odd difference is. However, when there is a difference obtained by multiplying a predetermined value to the pixel values between even pixels and odd pixels (the even-odd difference is multiplicative), the larger the luminance of the area is, the larger the even-odd difference is. For this reason, when differences in characteristics of even pixels and odd pixels are not additive, it is also necessary to correct pixels having large luminance values.

In contrast, since even-odd differences can be corrected by not only luminance values but also any pixel values according to the image correction system in the first exemplary embodiment of the present invention, problems such as those in the image reading device of PTL 2 can be solved.

Second Exemplary Embodiment

Next, the second exemplary embodiment of the present invention will be explained with reference to the drawings.

The second exemplary embodiment is different from the first exemplary embodiment in that a representative pixel value relationship extraction means is provided and in the operation of the pixel value relational expression estimation means. The representative pixel value relationship extraction means estimates a pixel value relational expression by selecting representative pixels instead of estimating a pixel value relational expression from all pixels.

{Configuration}

Figure 3:
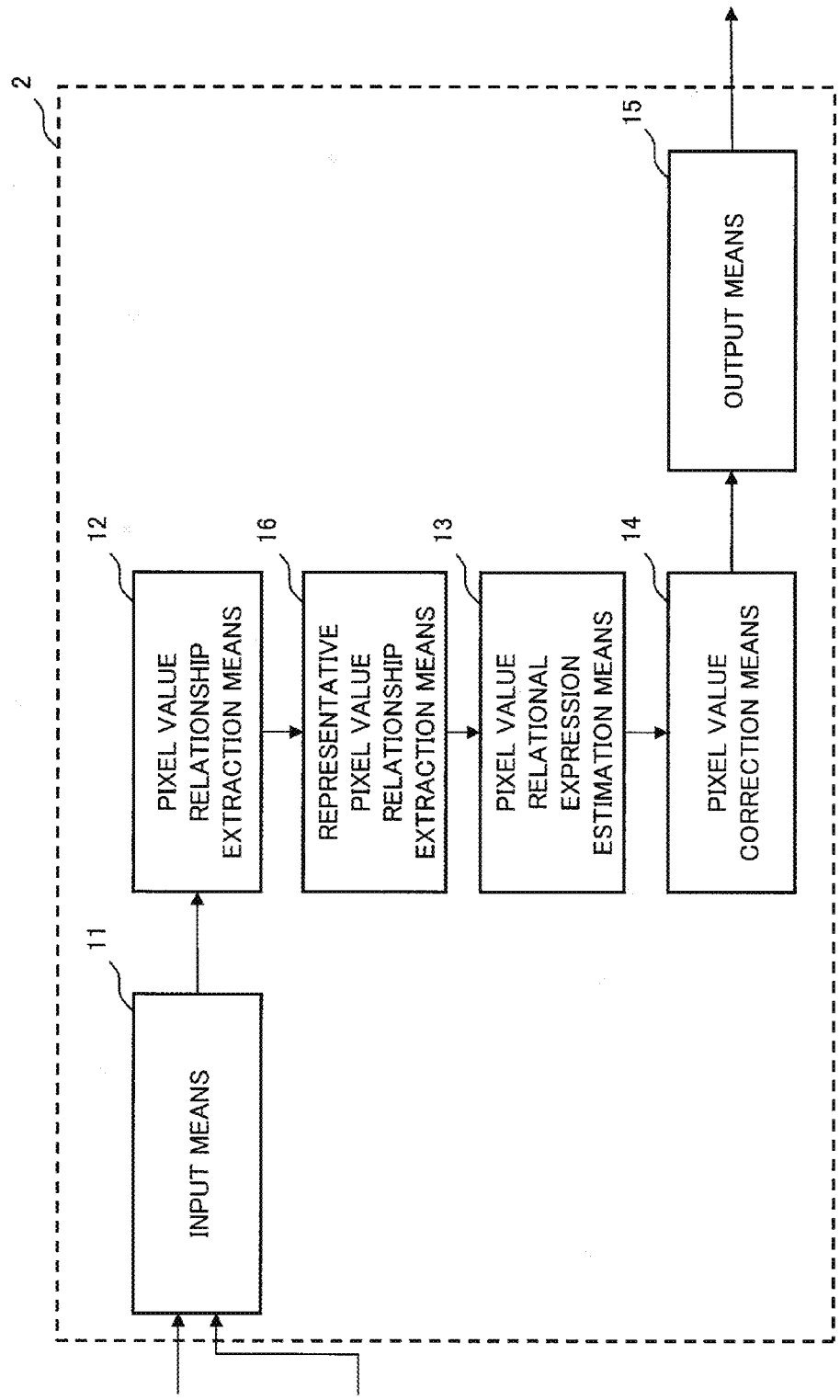
FIG. 3 is a block diagram illustrating a configuration of an image correction system according to a second exemplary embodiment of the present invention.

As illustrated in FIG. 3, an image correction system 2 according to a second exemplary embodiment includes a representative pixel value relationship extraction means 16 in addition to the image correction system 1 of the first exemplary embodiment. The representative pixel value relationship extraction means 16 illustrated in FIG. 3 is provided between the pixel value relationship extraction means 12 and the pixel value relational expression estimation means 13. Note that although CCDs are not illustrated in FIG. 3, signals similar to those of the first exemplary embodiment illustrated in FIG. 1 are assumed to be input to the input means 11.

Explanation of the input means 11 and the pixel value relationship extraction means 12 will be omitted since they are similar to those of the image correction system 1 of the first exemplary embodiment.

(Representative Pixel Value Relationship Extraction Means)

The representative pixel value relationship extraction means 16 determines a representative pixel value relationship from the pixel value relationship extracted by the pixel value relationship extraction means 12. For example, a representative pixel value $ro_i$ of odd pixels at a predetermined interval is obtained and a representative pixel value relationship [$ro_i$, $f(ro_i)$] is obtained for each representative pixel value $ro_i$ of odd pixels. Note that the predetermined interval may be set, for example, to every five pixel, every ten pixel, or the like in either of odd pixels or even pixels. An average value or a median value of pixel values ve of adjacent even pixels may be used for $f(ro_i)$, using, for example, a pixel value relationship [vo, ve] in a case that a number of pixels of odd pixels is ten pixels (vo=$ro_i$−4 to $ro_i$+5) in total before and after the $ro_i$. Note that an extraction method of a representative pixel value relationship by the representative pixel value relationship extraction means 16 is not limited to those listed herein and it is sufficient if it can extract a representative pixel value relationship from the pixel value relationship extracted by the pixel value relationship extraction means 12.

The pixel value relational expression estimation means 13 estimates a pixel value relational expression similarly to the first exemplary embodiment using the representative pixel value relationship extracted by the representative pixel value relationship extraction means 16.

Explanation of the pixel value correction means 14 and the output means 15 will be omitted since they are similar to those of the image correction system 1 of the first exemplary embodiment.

{Operation}

Next, an operation of the image correction system 2 according to the second exemplary embodiment will be explained with reference to a flowchart of FIG. 4.

Figure 4:
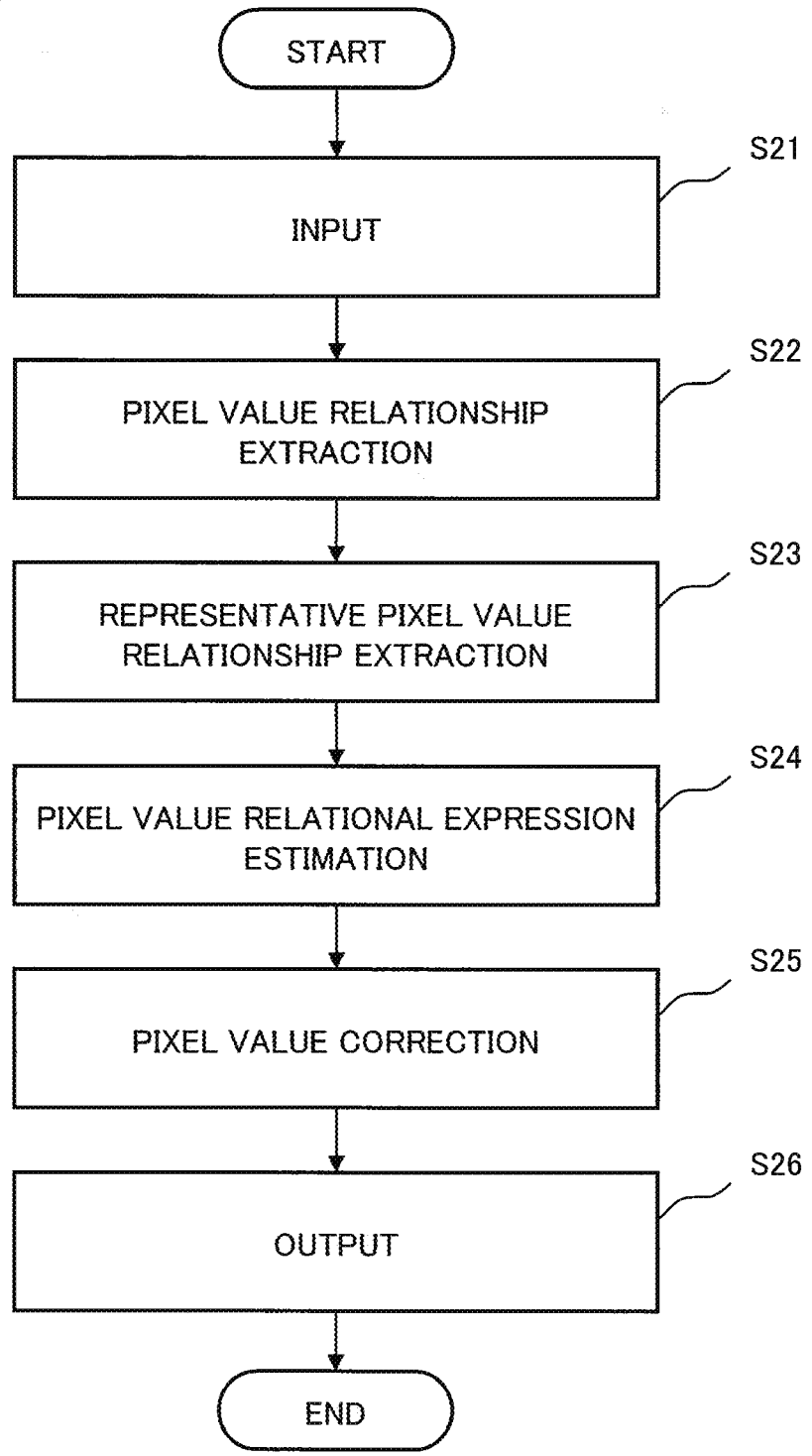
FIG. 4 is a flowchart illustrating an operation of the image correction system according to the second exemplary embodiment of the present invention.

In FIG. 4, first, the input means 11 inputs an image of a correction target (step 21).

The pixel value relationship extraction means 12 compares pixel values of adjacent pixels in the image of the correction target input by the input means 11 to extract a relationship of the pixel values of the adjacent pixels (step 22).

The representative pixel value relationship extraction means 16 obtains a representative pixel value relationship from the pixel value relationship extracted by the pixel value relationship extraction means 12 (step 23).

The pixel value relational expression estimation means 13 estimates, as a pixel value relational expression, an expression which best matches the pixel values among the representative pixels using the relationship of the pixel values among the representative pixels extracted by the pixel value relationship extraction means 12 (step 24).

The pixel value correction means 14 corrects a pixel value of each pixel of the correction target image using the pixel value relational expression estimated by the pixel value relational expression estimation means to generate a correction image (step 25).

The output means 15 outputs the correction image whose pixel values are corrected by the pixel value correction means 14 (step 26).

As described above, according to the image correction system according to the second exemplary embodiment of the present invention, a representative pixel value relationship is extracted from a pixel value relationship of adjacent pixels, a characteristic difference of each of an even circuit and an odd circuit is estimated, and correction is performed based on the estimation result. Accordingly, any characteristic difference at any pixel value for any capturing target can be corrected similarly to the image correction system according to the first exemplary embodiment. As a result, it is possible that characteristic differences of all pixels are eliminated by correcting a characteristic of each pixel for any image including a plurality of pixels having different characteristics to obtain a homogeneous output image.

Herein, effects characteristic to the second exemplary embodiment will be explained.

In the first exemplary embodiment, all pixel value relationships are used when estimating a pixel value relational expression. In contrast, since the second exemplary embodiment is configured to use only representative pixel value relationships, an amount of processing to estimate a pixel value relational expression can be reduced.

Furthermore, in the first exemplary embodiment, pixels not close to pixel values of adjacent pixels in edge portions or the like of an image are used for calculation since all pixel value relationships are used when estimating a pixel value relational expression. For this reason, when pixel values of adjacent pixels are very different, an estimation result may be affected and accuracy of the estimation result may be reduced. In contrast, since the second exemplary embodiment is configured to use only representative pixel value relationships, effects of those whose pixel values of adjacent pixels are very different on extraction of representative pixel value relationships become small. For this reason, effects on the estimation result by those whose pixel values of adjacent pixels are very different may be reduced. In particular, when a median value of pixel values of adjacent pixels is used as f(ro), those whose pixel values of adjacent pixels are very different becomes outliers and therefore there is an effect that effects on the estimation result may be further reduced since effects on the median value particularly become small.

Third Exemplary Embodiment

Next, the third exemplary embodiment of the present invention will be explained with reference to the drawings.

The third exemplary embodiment is different from the second exemplary embodiment in that a pixel value relationship histogram generation means is provided in addition to the configuration of the second invention and in the operation of representative pixel value relationship extraction means. The pixel value relationship histogram generation means extracts a representative pixel value relationship by generating a histogram (a frequency distribution) of pixel value relationships. Note that a histogram to be explained in the exemplary embodiments of the present invention means a two dimensional histogram unless otherwise specified.

{Configuration}

Figure 5:
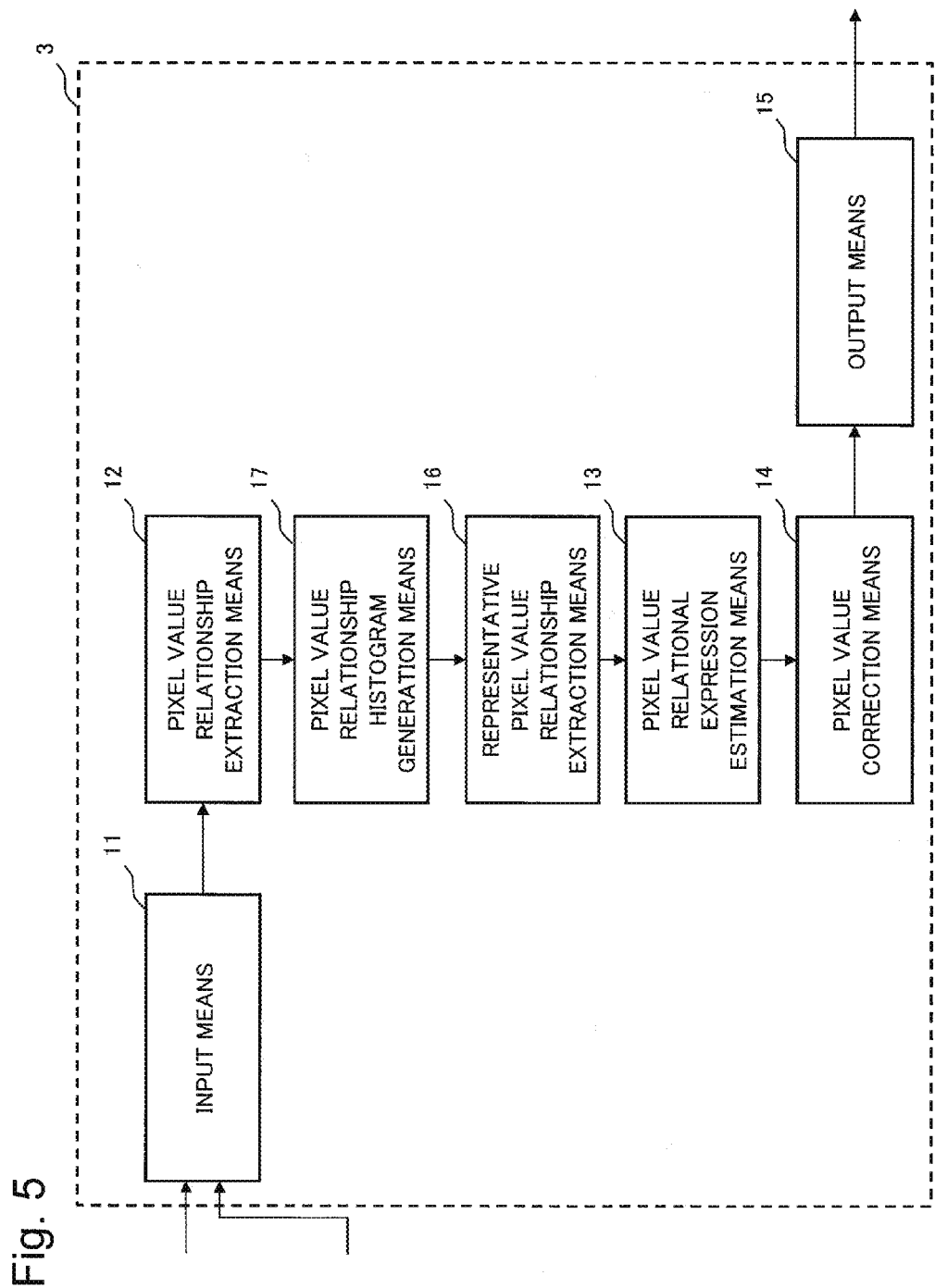
FIG. 5 is a block diagram illustrating a configuration of an image correction system according to a third exemplary embodiment of the present invention.

As illustrated in FIG. 5, an image correction system 3 according to the third exemplary embodiment includes a pixel value relationship histogram generation means 17 in addition to the image correction system 2 of the second exemplary embodiment. The pixel value relationship histogram generation means 17 illustrated in FIG. 5 is provided between the pixel value relationship extraction means 12 and the representative pixel value relationship extraction means 16. Note that although CCDs are not illustrated in FIG. 5, signals similar to those of the first exemplary embodiment illustrated in FIG. 1 are assumed to be input to the input means 11.

Explanation of the input means 11 and the pixel value relationship extraction means 12 will be omitted since they are similar to those of the image correction systems 1 and 2 of the first and second exemplary embodiments.

(Pixel Value Relationship Histogram Generation Means)

The pixel value relationship histogram generation means 17 generates a histogram of pixel value relationships extracted by the pixel value relationship extraction means 12. For example, every time a pixel value relationship [$vo_0$, $ve_0$] between an odd pixel and an even pixel is extracted, the pixel value relationship histogram generation means 17 votes once the pixel value relationship [$vo_0$, $ve_0$] in a plane whose horizontal axis is a pixel value of an odd pixel and whose vertical axis is a pixel value of an even pixel. Note that, in the present exemplary embodiments, a process is called a vote, which increments a frequency of a coordinate indicating the extracted pixel value relationship every time the pixel relationship is extracted, in a coordinate space constituted by a pixel value of an odd pixel and a pixel value of an even pixel. The pixel value relationship histogram generation means 17 obtains a pixel value relationship histogram indicating which relationships of pixel values between odd pixels and even pixels are often seen, by repeating the vote for all pixel value relationships.

An example of employing a pixel value with the highest frequency as a pixel value of an even pixel of a representative pixel value relationship is illustrated as a histogram generation method of the pixel value relationship histogram generation means 17 according to the present exemplary embodiment. As another method of determining a pixel value of an even pixel of a representative pixel value relationship, it is possible to apply a method in which only those whose frequencies are greater than a predetermined value are averaged and the average value is employed. In this case, effects of averaging can be expected only when correlation of pixel values of adjacent pixels is large and effects that an estimation result becomes stable can be expected. Note that, even in methods other than these, it is included in the scope of the present invention that pixel value relationships extracted by a pixel value relationship extraction means are analyzed using a statistical method and the analysis result is set as a representative pixel value relationship.

The representative pixel value relationship extraction means 16 extracts a representative pixel value relationship using a pixel value relationship histogram generated by the pixel value relationship histogram generation means. For example, for a pixel value of an odd pixel, a representative pixel value relationship [$ro_i$, $f(ro_i)$] for a pixel value $ro_i$ of each odd pixel is obtained. At this time, from the pixel value relationship histogram generated by the pixel value relationship histogram generation means 17, a histogram in which only cases that a value of odd pixels is $ro_i$, are extracted is generated and a value veo at which the frequency becomes highest is obtained. The representative pixel value relationship can be extracted by setting $f(ro_i)=ve_0$.

In the above explanation, a representative pixel value relationship is obtained using a pixel value relationship histogram indicating a relationship between an odd pixel and an even pixel located on the right side thereof. In addition, there is a method in which both of a pixel value relationship histogram indicating a relationship between an odd pixel and an even pixel located on the right side thereof and a pixel value relationship histogram indicating a relationship between an even pixel and an odd pixel located on the right side thereof are obtained. In this case, the representative pixel value relationship may be obtained using both of the histograms.

Explanation of the pixel value correction means 14 and the output means 15 will be omitted since they are similar to those of the image correction system 1 of the first and second exemplary embodiments.

{Operation}

Next, an operation of the image correction system 3 according to the third exemplary embodiment will be explained with reference to a flowchart of FIG. 6.

Figure 6:
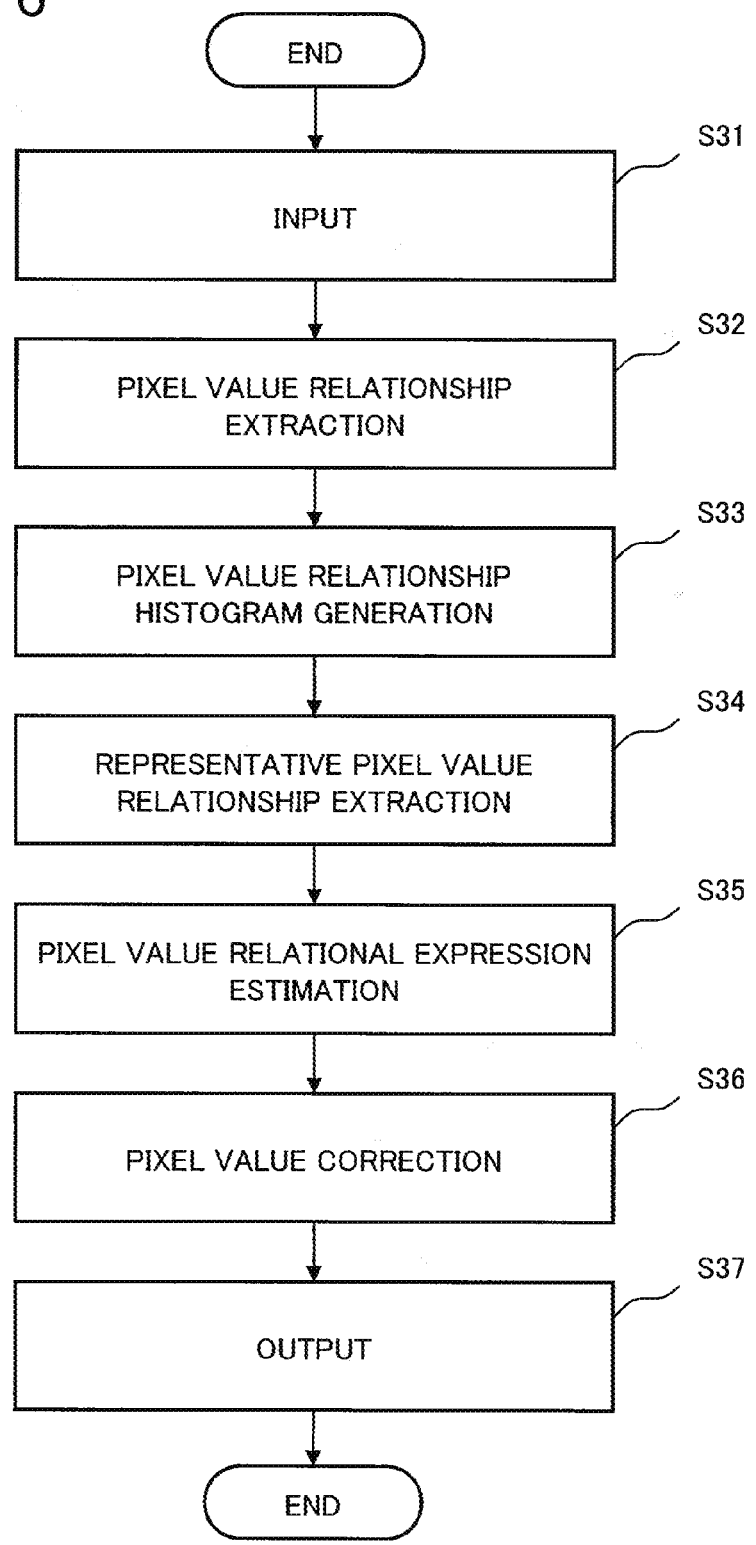
FIG. 6 is a flowchart illustrating an operation of the image correction system according to the third exemplary embodiment of the present invention.

In FIG. 6, first, the input means 11 inputs an image of a correction target (step 31).

The pixel value relationship extraction means 12 compares pixel values of adjacent pixels in the image of the correction target input by the input means 11 to extract a relationship of pixel values among adjacent pixels (step 32).

The pixel value relationship histogram generation means 17 generates a histogram of pixel value relationships extracted by the pixel value relationship extraction means 12 (step 33).

The representative pixel value relationship extraction means 16 extracts a representative pixel value relationship using the pixel value relationship histogram generated by the pixel value relationship histogram generation means 17 (step 34).

Using the relationship of the pixel values among the representative pixels extracted by the pixel value relationship extraction means 12, the pixel value relational expression estimation means 13 estimates, as a pixel value relational expression, an expression which best matches the pixel values among the representative pixels (step 35).

The pixel value correction means 14 corrects a pixel value of each pixel of the correction target image using the pixel value relational expression estimated by the pixel value relational expression estimation means to generate a correction image (step 36).

The output means 15 outputs the correction image whose pixel values are corrected by the pixel value correction means 14 (step 37).

As described above, according to the image correction system according to the third exemplary embodiment of the present invention, a representative pixel value relationship is extracted from a pixel value relationship among adjacent pixels, a characteristic difference of each of an even circuit and an odd circuit is estimated, and correction is performed based on the estimation result. Accordingly, any characteristic difference at any pixel value for any capturing target can be corrected similarly to the image correction systems according to the first and second exemplary embodiments. As a result, it is possible that characteristic differences of all pixels are eliminated by correcting a characteristic of each pixel for any image having a plurality of pixels having different characteristics to obtain a homogeneous output image.

Herein, effects characteristic to the image correction system according to the third exemplary embodiment will be explained.

When correlation among pixel values of adjacent pixels at edge portions and the like of an image is low, pixel value relationships of the portions form various relationships. For this reason, plotting a histogram as in the third exemplary embodiment, frequencies become small in portions where correlation among pixel values of adjacent pixels is low. Portions where frequencies become large are limited to those where correlation among adjacent pixels is high. For this reason, effects due to edge portions and the like may be eliminated by using portions where frequencies are large. Thus, according to the third exemplary embodiment, accuracy of the estimated pixel value relational expression may be further improved compared with the first and second exemplary embodiments.

The above is the explanation of the image correction systems according to the exemplary embodiments of the present invention. It is understood that image correction systems obtained by performing various modifications or additions to the above configurations and operations are also included within the scope of the present invention. Furthermore, it is understood that an image correction method according to the exemplary embodiments of the present invention and an image correction program for causing a computer to execute the image correction method are also included within the scope of the present invention. In addition, a program storage medium which stores the image correction program is also included within the scope of the present invention.

Next, the present invention will be explained using particular examples.

EXAMPLE 1

First, an example 1 corresponding to the first exemplary embodiment of the present invention will be explained. Note that the example 1 has the configuration illustrated in FIG. 1.

Figure 7:
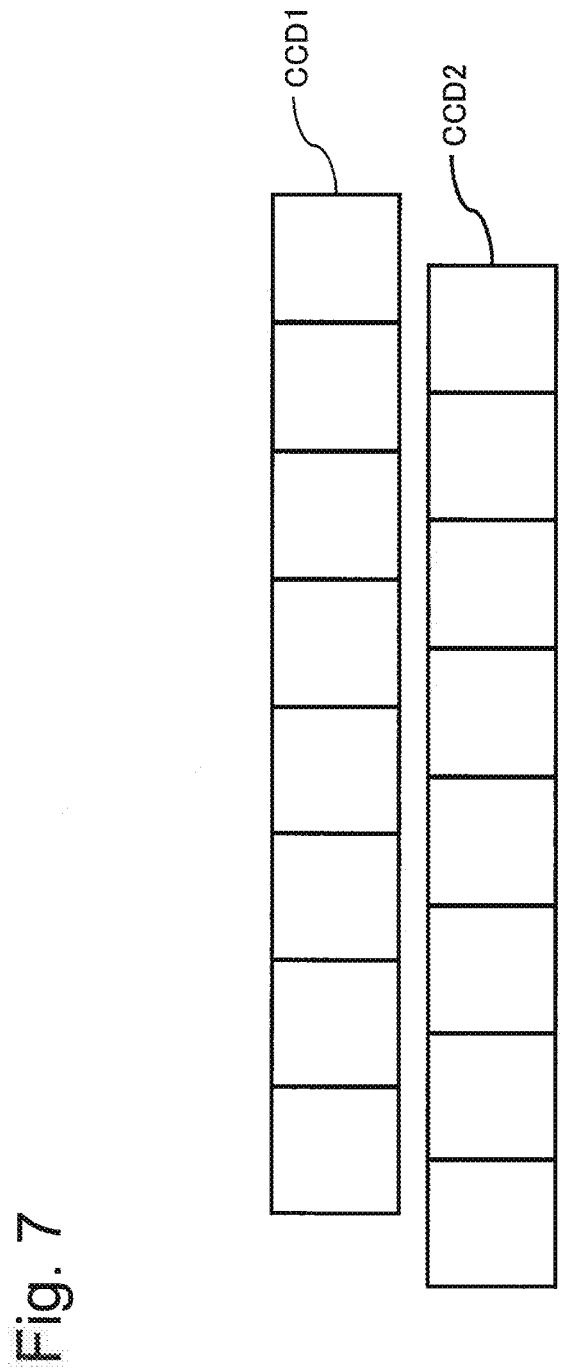
FIG. 7 is a diagram illustrating an example of arrangement of CCD sensors according to an example of the present invention.
Figure 8:
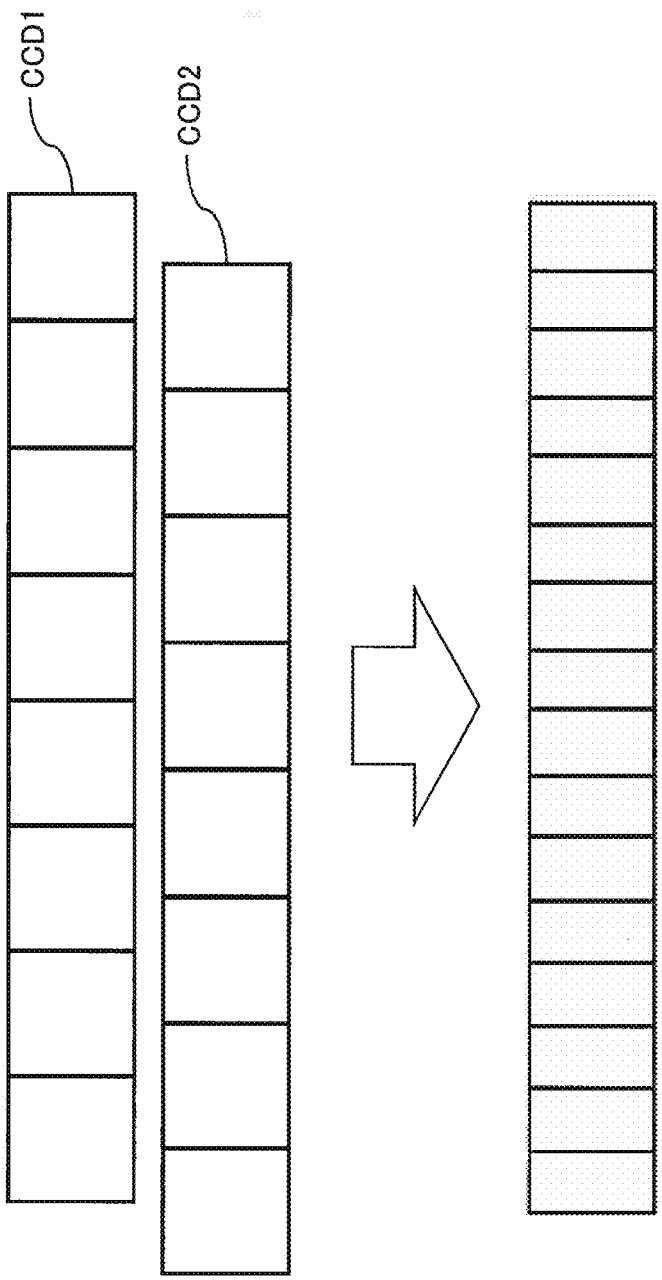
FIG. 8 is a diagram illustrating an example of a composition of pixel values of CCD sensors according to an example of the present invention.

In the example 1, as illustrated in FIG. 7, an example in which two rows of CCD sensors are arranged with one half of a pixel shifted to each other will be explained. For example, the present example can be applied to an image correction system which corrects an image obtained by an image sensor mounted on an aircraft or a satellite As illustrated in FIG. 8, a composite image is generated by alternately arranging pixel values of two CCDs (CCD1 and CCD2) arranged in two rows. In other words, generating an image in which pixel values of CCD1 are assigned to odd pixels and pixel values of CCD2 are assigned to even pixels, it can make an image with a resolution which is two times the resolution of CCD1 and CCD2.

A CCD is intended to obtain pixel values by converting intensity of input light to an amount of charge but the intensity of the input light and a magnitude of the output pixel value are not in a linear relationship and a characteristic thereof is generally different from circuit to circuit.

Figure 9:
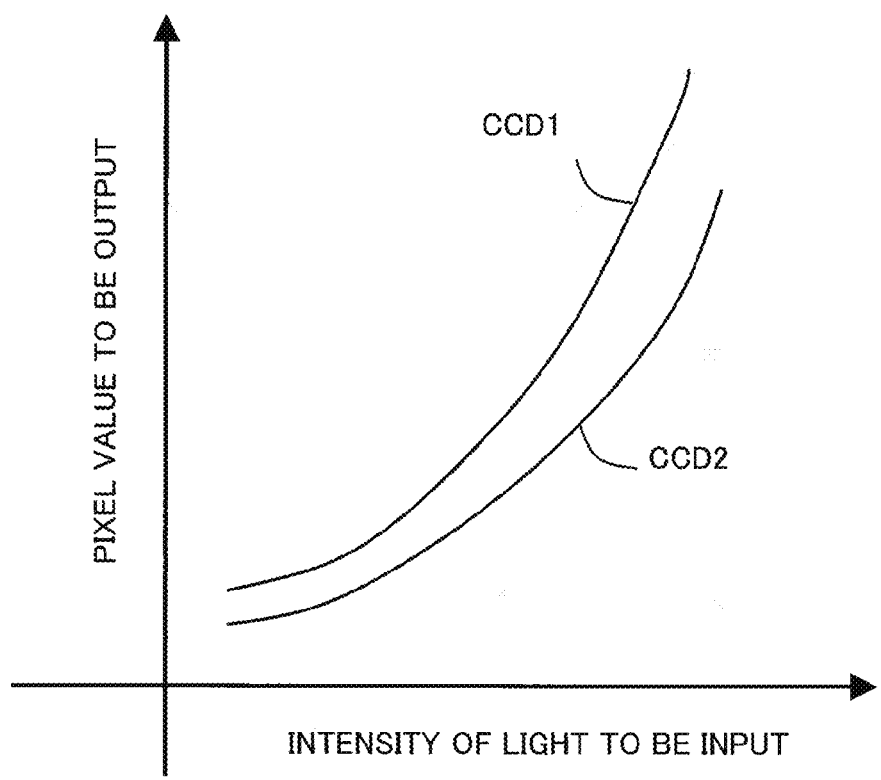
FIG. 9 is a diagram illustrating an example of an input-output characteristic of a circuit according to an example of the present invention.

In FIG. 9, an input-output characteristic of such a CCD is illustrated. In other words, even if lights with the same intensity are input, output pixel values are different for CCD1 and CCD2 since the input-output characteristics of circuits of CCD1 and CCD2 are different. As a result, a composite image becomes an image having stripes which is formed by different pixel values in even pixels and odd pixels.

The input-output relationship for each circuit depends on various factors such as temperature and an capturing rate (a time interval required for capturing an image of one pixel) and are often unknown accurately in advance. In the present example, although it is known that the input-output characteristic of each circuit is a polynomial with a known degree, it is assumed that coefficients of the polynomial cannot be determined in advance since the input-output characteristic of each circuit changes from capturing to capturing due to various factors.

First, it is assumed that the input means 11 inputs image information via a receiver which downloads images captured by an image sensor of an aircraft or a satellite in wireless communication with the aircraft or the satellite. For example, image data of a correction target is received by an unillustrated receiver from an aircraft or a satellite and the image of the correction target is input to an unillustrated processing computer. It is assumed that the input image of the correction target is stored in an image buffer in the processing computer.

Figure 10:
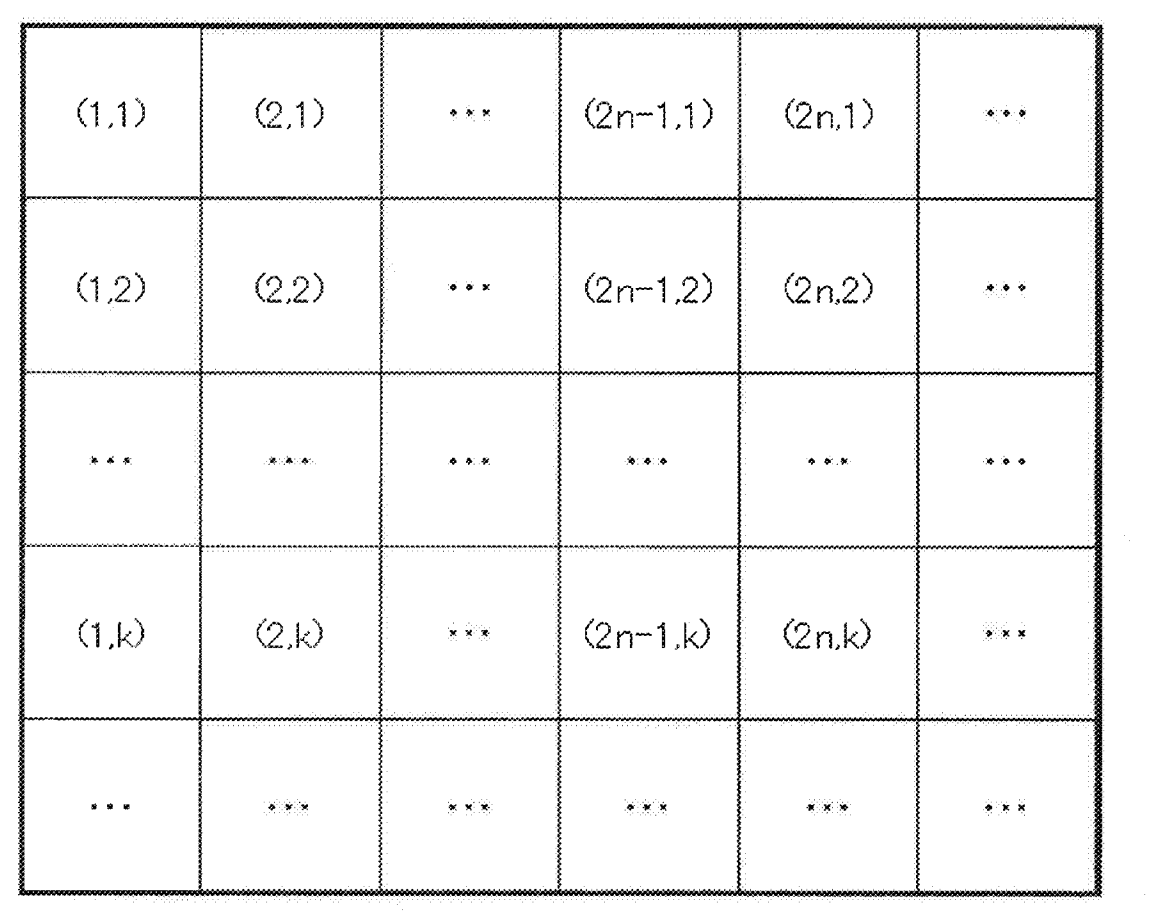

Hereinafter, for the sake of explanation, it is assumed that pixel numbers are allocated to the image data in the image buffer as illustrated in FIG. 10. A pixel captured by CCD1 is denoted by an odd pixel (2n−1, k) and a pixel captured by CCD2 is denoted by an even pixel (2n, k).

The pixel value relationship extraction means 12 of FIG. 1 extracts a relationship of pixel values of an odd pixel and an even pixel.

Assuming that, when a pixel value of an odd pixel (2n−1, k) is $vo_0$, a pixel value of an even pixel (2n, k) on the right side thereof is $ve_0$, for example, $[vo_0, ve_0]$ is extracted as a pixel value relationship with respect to a set of the odd pixel (2n−1) and the even pixel (2n, k). Pixel value relationships for a total number of even pixels will be extracted by extracting the pixel value relationships from all pixels as $[vo_0, ve_0], [vo_1, ve_1], \ldots, [vo_i, ve_i], \ldots$. Note that i is a number assigned to a set of certain odd and even pixels and is an integer equal to or greater than 0. In other words, a pixel value relationship of a set of an odd pixel and an even pixel with a set number i is $[vo_i, ve_i]$.

The pixel value relational expression estimation means 13 of FIG. 1 estimates a pixel value relational expression representing a pixel value relationship of odd pixels and even pixels from the pixel value relationships extracted by the pixel value relationship extraction means 12. It is assumed that the pixel value relational expression is expressed by a polynomial, the degree thereof being known but the coefficients thereof being unknown (expression 1). Note that in the expression 1, j denotes the degree of the polynomial.

$$ve = \sum_j a_j vo^j \tag{1}$$

Figure 11:
FIG. 11 is a diagram illustrating an example of a pixel value profile of an image obtained by CCD sensors according to an example of the present invention.
Figure 12:
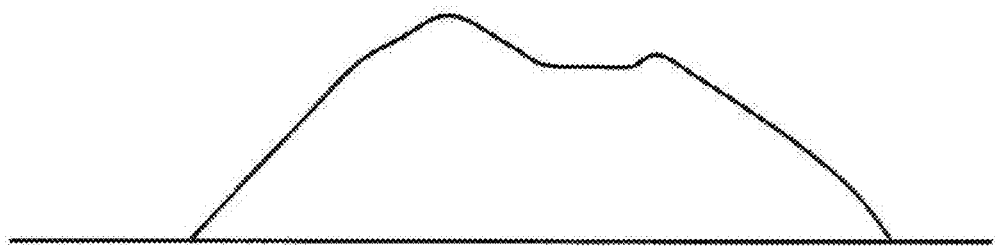
FIG. 12 is a diagram illustrating an example of a pixel value profile of an image obtained by CCD sensors according to an example of the present invention.

Generally, most of areas in an image except for some areas such as edges are smooth and values of adjacent pixels become close values. For example, when artificial objects such as a roof of a building and a car is captured, a pixel value profile as illustrated in FIG. 11 may be obtained and, although a boundary portion between an object and a background is discontinuous, adjacent pixels in portions other than the portion are of approximately the same value. In addition, in a case that a target object is a natural object, an edge is not as clear as that in an artificial object but a profile is smooth as illustrated in FIG. 12 and it is often the case that adjacent pixels also take similar pixel values.

The coefficients of the pixel value relational expression are determined such that the pixel value $vo_i$ of the odd pixel and the pixel value $ve_i$ of the even pixel are best matched. In particular, aj which minimizes energy E in an expression 2 described below is obtained.

$$E = \sum_i \left\{ ve_i - \sum_j a_j vo_i^j \right\}^2 \tag{2}$$

The pixel value correction means 14 of FIG. 1 replaces all odd pixels of the correction target image stored in the image buffer with pixel values converted using the pixel value relational expression. Furthermore, the correction target image is converted to a correction image with all even pixels having the original pixel values.

The output means 15 of FIG. 1 stores the correction image in a hard disc for an image product storage on a network.

Figure 13:
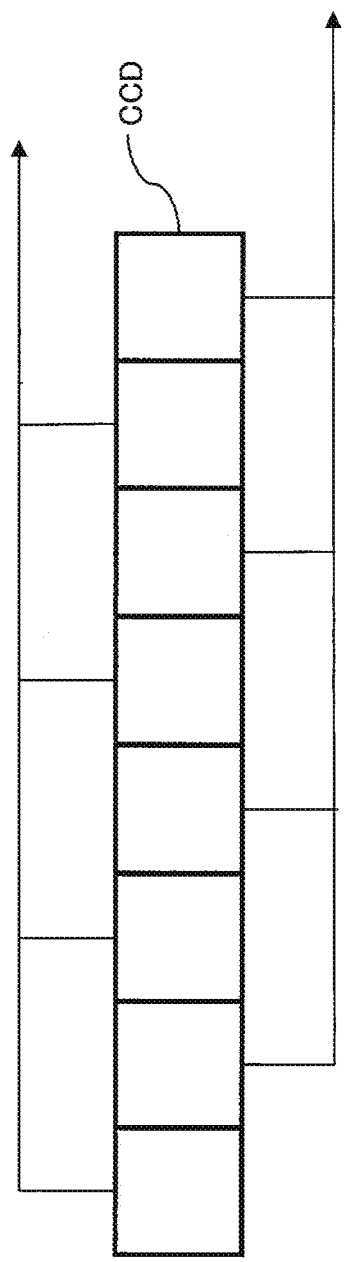
FIG. 13 is a diagram illustrating an example of a method of reading CCD sensors according to an example of the present invention.
Figure 14:
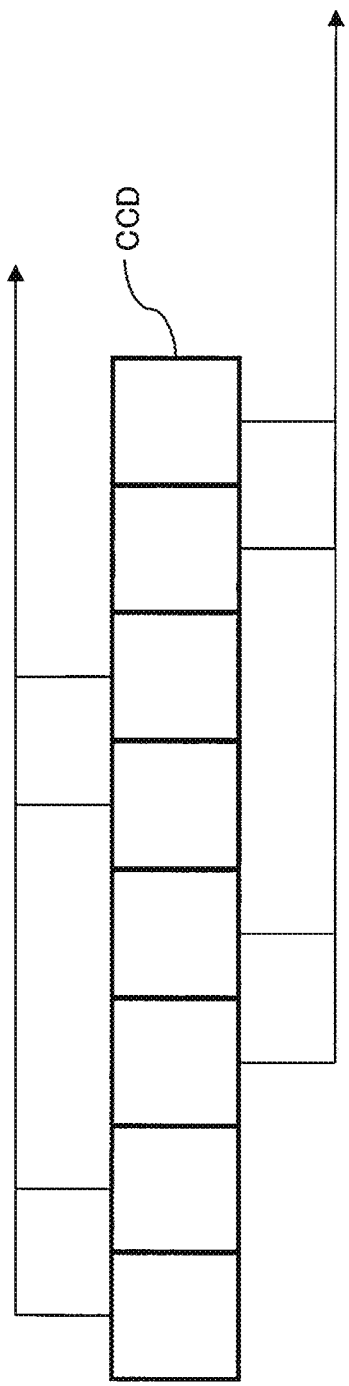
FIG. 14 is a diagram illustrating an example of a method of reading CCD sensors according to an example of the present invention.

In the present example, a case is assumed that two CCDs with a half pixel shifted as illustrated in FIG. 7 are arranged. For example, even in a sensor in which two reading circuits for each of even and odd are connected to one CCD as illustrated in FIG. 13, it becomes a sensor in which input-output characteristics are different for even pixels and odd pixels, which becomes the same situation as the case explained in the present example. In addition, in the present example, it is assumed that characteristics are different in even pixels and odd pixels. In a case that reading circuits are connected to a CCD as illustrated in FIG. 14 and in a case like that, estimation of the pixel value relational expression may be performed using only portions adjacent to pixels having different characteristics, even when pixels having different characteristics are not in an alternate relationship.

Furthermore, although the present example has been explained assuming that there are two types of pixels having different characteristics, it is not necessary to limit to two types and it may be, for example, a configuration consisting of three CCDs, each being shifted by one third pixel. Even in a case that there are pixels with three types of different characteristics, it may be applicable by estimating alternatingly three types of pixel value relational expressions among from each of adjacent pixels.

In the present example, although the present invention is applied to an image correction system for correcting an image captured by an aircraft or a satellite, it may be applied to any imaging sensors.

In addition, the input means 11 has been explained in an example in which data is received via wireless communication to be input to a processing computer. Furthermore, it is possible to use any input method such as directly inputting image information from an image sensor and inputting via a physical medium such as a memory card and a CD.

Although the output means 15 has been explained in an example of outputting to a hard disc for storage on a network, it is possible to use any output method such as outputting directly to a physical medium such as a memory card and a CD and outputting to a display device such a display.

In the present example, it is assumed that $[vo_0, ve_0]$ is extracted as the pixel value relationship when, in a case that a pixel value of an odd pixel (2n−1, k) is $vo_0$, a pixel value of an even pixel (2n, k) on the right side thereof is $ve_0$. Furthermore, it may be also assumed that $[vo_1, ve_1]$ is extracted as the pixel value relationship when, in a case that a pixel value of an odd pixel (2n+1, k) is $vo_1$, a pixel value of an even pixel (2n, k) on the left side thereof is $ve_1$. In addition, when both of the pixel values are used, there is an effect of improving accuracy since both of right-to-left and left-to-right relationships of even pixels and odd pixels are equally entered.

In the present example, in the pixel value relational expression estimation means 13, a pixel value relational expression is estimated as a polynomial whose degree is known. However, it is not necessary that the degree is known. It is also possible to configure such that, assuming that the degree is unknown, estimation may be performed, including the optimal degree with AIC or MDL as a reference (AIC: An Information Criterion or Akaike Information Criterion, MDL: Minimum Description Length). In addition, any expression not limited only to a polynomial may be used.

The optimal coefficients in being estimated by the pixel value relational expression estimation means 13 may be analytically determined by solving simultaneous equations obtained assuming that those obtained by partially differentiating the expression 2 by each of the coefficients are 0. Furthermore, it is possible to determine the optimum coefficients by any optimization method such as numerical calculation.

EXAMPLE 2

Next, a second example corresponding to the second exemplary embodiment of the present invention will be explained. Note that the example 2 has a configuration illustrated in FIG. 3.

The example 2 is different from the example 1 in that the representative pixel value relationship extraction means is provided and in the operation of the pixel value relational expression estimation means. Note that explanation of operations similar to those of the example 1 will be omitted.

In the example 1, the coefficients are obtained by minimizing the expression 2 using all of the pixel value relationships. In the example 2, without using all of the pixel value relationships, representative pixel value relationships are extracted by the representative pixel value relationship extraction means 16 and a pixel value relational expression is obtained by the pixel value relational expression estimation means 13 using only the representative pixel value relationships.

The representative pixel value relationship extraction means 16 of FIG. 3 determines, with respect to pixel values of odd pixels, a representative pixel value $ro_i$ of an odd pixel at a predetermined interval such as, for example, every ten pixel and obtains a representative pixel value relationship $[ro_i, f(ro_i)]$ for every representative pixel value $ro_i$ of odd pixels.

For example, as $f(ro_i)$, an average value or a median value of pixel values ve of adjacent even pixels may be used using pixel value relationships [vo, ve] of total ten pixels ($vo=ro_i-4$ to $ro_i+5$) before and after an odd pixel whose pixel value is $ro_i$.

The pixel value relational expression estimation means 13 of FIG. 3 estimates a pixel value relational expression using the representative pixel value relationship $[ro_i, f(ro_i)]$ obtained by the representative pixel value relationship extraction means 16. A method similar to that of the example 1 may be used for the estimation method.

Note that the pixel value relational expression need not be necessarily an expression. For example, it may be also determined by using directly the representative pixel value relationship assuming that the closest representative pixel value to the odd pixel value vo is $ro_i$ and the pixel value relational expression is an expression 3 described below.

$$ve = f(ro_i) + (vo - ro_i) \qquad (3)$$

According to the example 2, an amount of processing in estimating the pixel value relational expression may be reduced since it is configured such that only the representative pixel value relationships are used.

In the example 2, since it is configured such that only the representative pixel value relationships are used, those whose pixel values of adjacent pixels are very different have small effects on extraction of representative pixel value relationships. Therefore, it is possible to reduce effects on estimation results by those whose pixel values of adjacent pixels are very different.

EXAMPLE 3

Next, an example 3 corresponding to the third exemplary embodiment of the present invention will be explained. Note that the example 3 has a configuration illustrated in FIG. 5.

The example 3 is different from the second exemplary embodiment in that the pixel value relationship histogram generation means is provided in addition to the configuration of the example 2 and in the operation of the representative pixel value relationship extraction means. Note that explanation of operations similar to the example 1 or 2 is omitted.

In the pixel value relationship histogram generation means 17 of FIG. 5, a histogram of a pixel value relationship extracted by the pixel value relationship extraction means 12 is generated.

Figure 15:
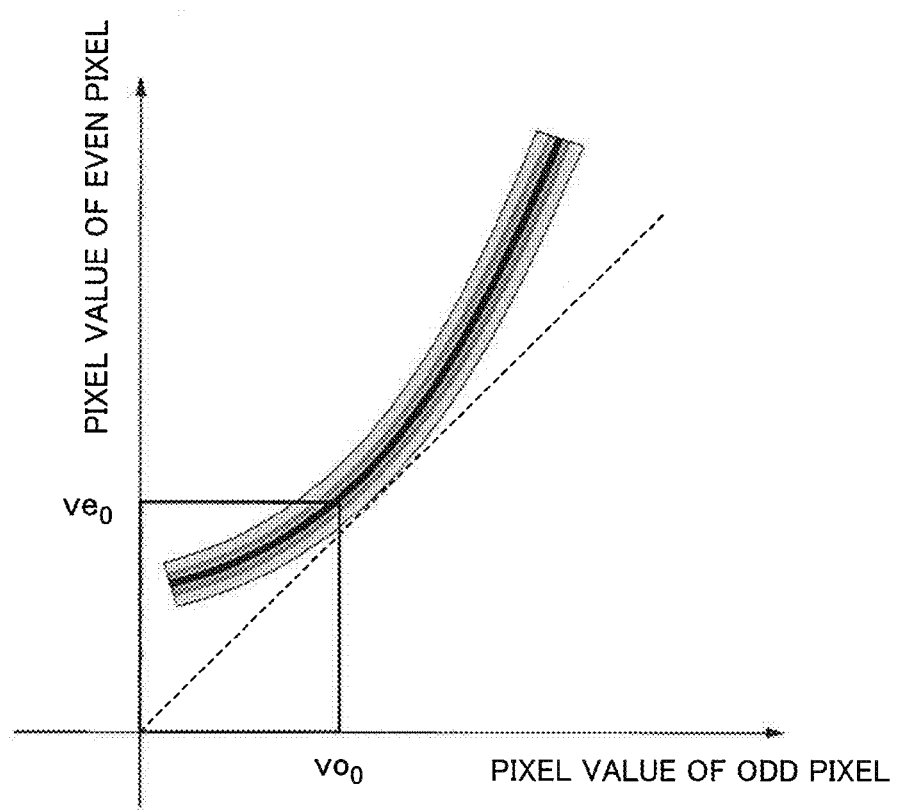
FIG. 15 is a diagram illustrating an example of a pixel value relationship histogram according to an example of the present invention.

For example, when a pixel value relationship [$vo_0$, $ve_0$] between an odd pixel and an even pixel is extracted, one vote is performed in a coordinate plane whose horizontal axis is a pixel values of an odd pixel and whose vertical axis is a pixel value of an even pixel. By repeating such a vote for all of the pixel value relationships, a two dimensional histogram as illustrated in FIG. 15 can be obtained by obtaining a pixel value relationship histogram representing what kind of relationships of pixel values between odd pixels and even pixels are often seen. Note that, in an area illustrated as a thick line indicated in the histogram of FIG. 15, a portion near the center of the thick line corresponding to a portion where frequencies are large is illustrated as being dark and a peripheral portion of the thick line corresponding to a portion where frequencies are small is illustrated as being light. In an actual histogram, the density (a number of points) of a plot is large in a portion where frequencies are large and the density (a number of points) of a plot is small in a portion where frequencies are small.

The representative pixel value relationship extraction means 16 of FIG. 5 extracts a representative pixel value relationship using the pixel value relationship histogram generated by the pixel value relationship histogram generation means 17.

Figure 16:
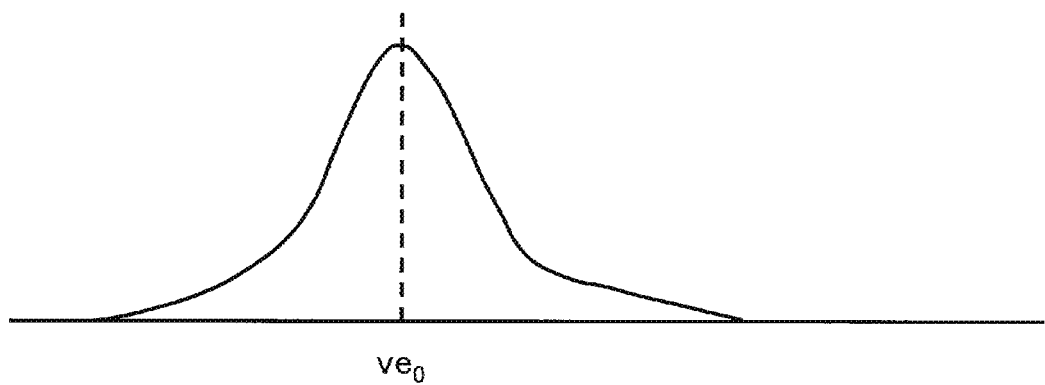
FIG. 16 is a diagram illustrating an example of a cross section of a pixel value relationship histogram according to an example of the present invention.

In the example 3, with respect to pixel values of odd pixels, a histogram is generated by extracting the representative pixel value relationship [$ro_i$, $f(ro_i)$] corresponding to the pixel value $ro_i$ of each odd pixel from the pixel value relationship histogram illustrated in FIG. 15 only for cases that the value of the odd pixel is $ro_i$ (FIG. 16). Obtaining from FIG. 16 a value veo at which the frequency is largest, it is defined as $f(ro_i)=ve_0$.

According to the example 3, the representative pixel value relationship is obtained using a pixel value relationship histogram representing a relationship between an odd pixel and an even pixel located on the right side thereof. Furthermore, there is a method in which both of a pixel value relationship histogram representing a relationship between an odd pixel and an even pixel located on the right side thereof and a pixel value relationship histogram representing a relationship between an even pixel and an odd pixel located on the right side thereof are obtained. In this case, it is possible to obtain a representative pixel value relationship using both of the histograms.

Figure 17:
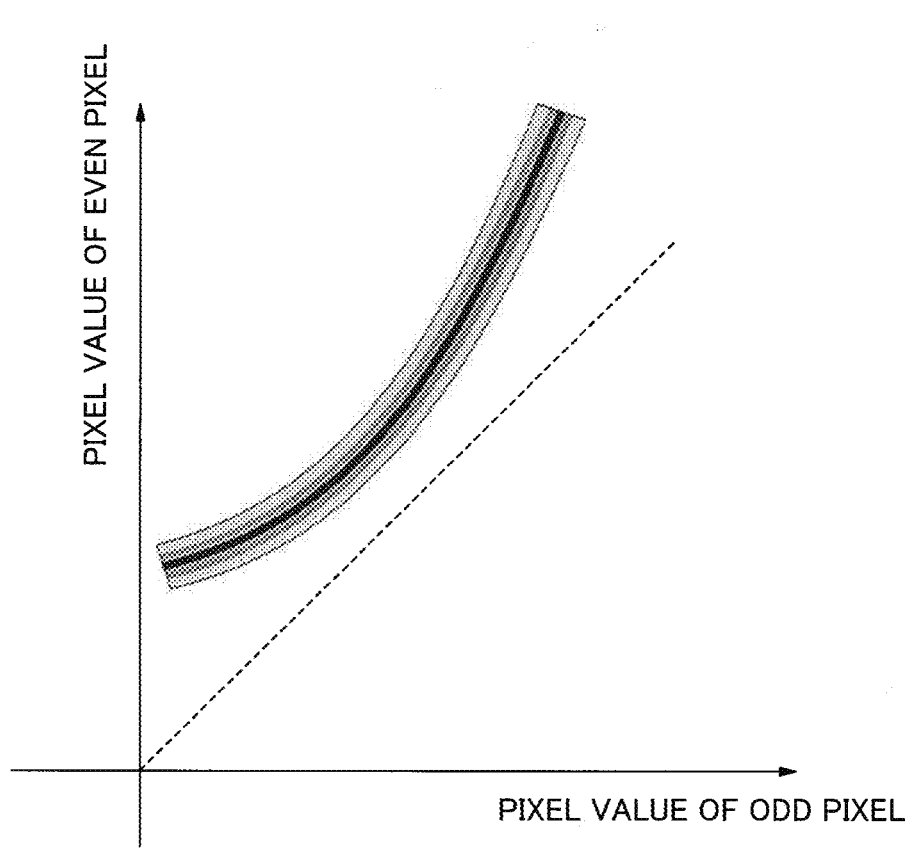
FIG. 17 is a diagram illustrating an example of a pixel value relationship histogram according to an example of the present invention.
Figure 18:
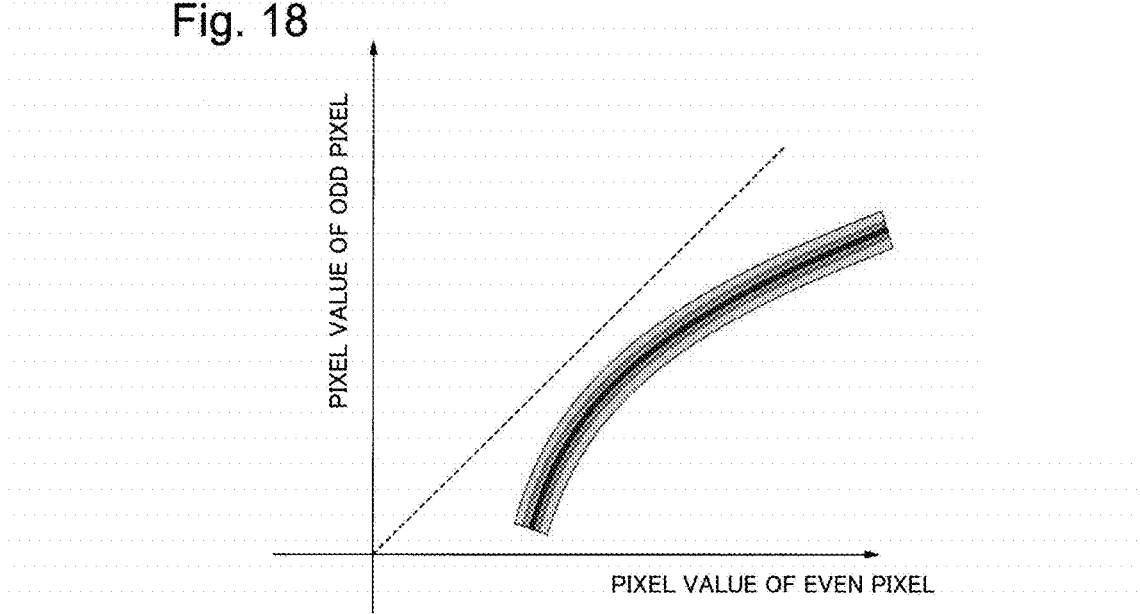
FIG. 18 is a diagram illustrating an example of a pixel value relationship histogram according to an example of the present invention.

A relationship of pixel values between odd pixels and even pixels and a relationship of pixel values between even pixels and odd pixels are symmetric. Therefore, when a pixel value relationship histogram of odd pixels and even pixels on the right side thereof becomes the one illustrated in FIG. 17, a pixel value relationship histogram of even pixels and odd pixels on the right side thereof becomes the one illustrated in FIG. 18 and they should be symmetrical against a straight line indicated by a broken line. Note that broken lines illustrated in FIG. 17 and FIG. 18 are direct proportional strait lines of a proportionality constant 1. In the histograms illustrated in FIG. 17 and FIG. 18, dark portions represent portions where frequencies are high.

Figure 19:
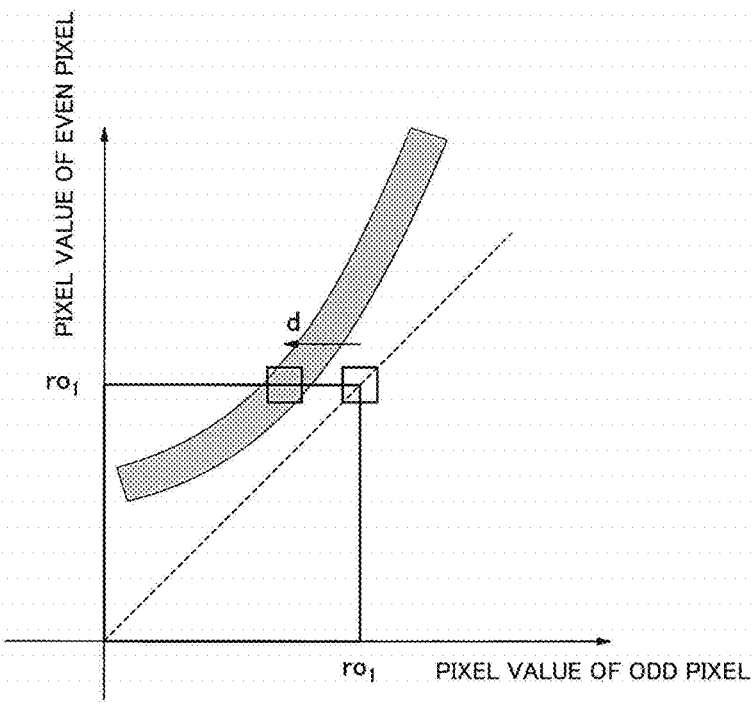
FIG. 19 is a diagram illustrating an example of a search of an optimum value in a pixel value relationship histogram according to an example of the present invention.
Figure 20:
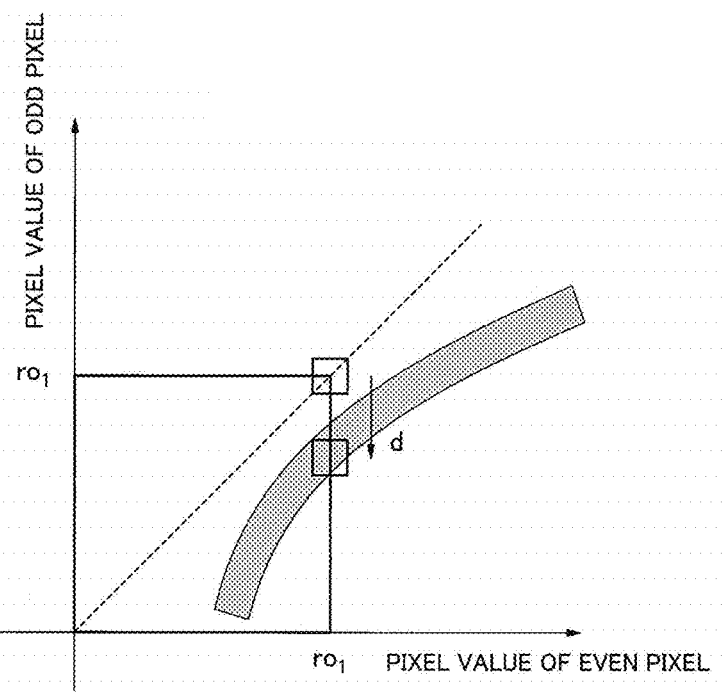
FIG. 20 is a diagram illustrating an example of a search of an optimum value in a pixel value relationship histogram according to an example of the present invention.

A method of obtaining the representative pixel value relationship [$ro_i$, $f(ro_i)$] for the pixel value $ro_i$ of an odd pixel is explained using FIG. 19 and FIG. 20. Note that, in FIG. 19 and FIG. 20, areas are illustrated homogenously regardless of magnitudes of frequencies.

First, a square area of a predetermined size centered on ($ro_i$, $ro_i$) as illustrated in FIG. 19 and FIG. 20 is considered. The square area is shifted by a distance d to the left in a pixel value relationship histogram (FIG. 19) of even pixels located on the right side of odd pixels and to the downward in a pixel value relationship histogram (FIG. 20) of odd pixels located on the right side of even pixels. Then a difference between the histograms within the square areas is considered. The difference between the histograms is expressed by energy $E(ro_i, d)$ as expressed in an expression 4.

$$E(ro_i,d)=D(ro_i,d)/N(ro_i,d) \quad (4)$$

Note that $D(ro_i, d)$ is a difference of the histograms in the areas in a case that the area centered on the pixel value $ro_i$ is shifted by d. In other words, $D(ro_i, d)$ is a total of differences between the histogram (FIG. 19) of odd pixels in the square area shifted to the left by the distance d and the histogram (FIG. 20) of even pixels in the square area shifted to the downward by the distance d.

$N(ro_i, d)$ is a number of elements in the square. In other words, $N(ro_i, d)$ is a total of sums of the histogram (FIG. 19) of odd pixels in the square area shifted to the left by the distance d and the histogram (FIG. 20) of even pixels in the square area shifted to the downward by the distance d.

For example, a distance d at which the energy E becomes minimum is set to an optimum value $d_{opt}$ when, assuming a minimum value and a maximum value of $D(ro_i, d)$ to be parameters, the distance d is changed in a predetermined range such as a range from the minimum value to the maximum value. Then, the representative pixel value relationship may be determined by an expression 5.

$$f(ro_i)=ro_i-d_{opt} \quad (5)$$

When a degree of similarity of histograms is obtained in units of pixels, a relationship among adjacent odd pixels and even pixels may be affected by a pattern of an image because of a reason that a long edge exists in the exactly same direction as a pixel line in an image and the like. However, such a problem can be reduced by obtaining a degree of similarity of histograms in units of areas.

Note that it is preferable that histogram measurement of the example 3 is performed in a range in which a relationship between even pixels and odd pixels is the same. Therefore, it is preferable that histogram measurement is performed for each CCD and for each port if it is photosensitive over the entire visible wavelength range and that histogram measurement is performed for each CCD and for each band if it is multi-bands.

In the above example 3, effects of edges of an image and the like may be more reduced than those in the example 2 by obtaining a representative pixel value relationship based on a histogram.

Having thus explained the present invention with reference to the exemplary embodiments and examples, the present invention is not limited to the above exemplary embodiments and examples. It is possible to make various modifications those skilled in the art can understand to the configurations and the details of the present invention within the scope of the present invention.

This application claims priority based on Japanese Patent Application No. 2013-008902, filed on Jan. 22, 2013, the entire disclosure of which is incorporated herein.

REFERENCE SIGNS LIST 1, 2, 3 image correction system
11 input means
12 pixel value relationship extraction means
13 pixel value relational expression estimation means
14 pixel value correction means
15 output means
16 representative pixel value relationship extraction means
17 pixel value relationship histogram generation means
21, 22 CCD

What is claimed is:

1. An image correction system for correcting image data from pixels connected to at least two different input paths, the image correction system comprising:
a memory for storing instructions; and
a processor coupled to the memory, the processor configured to execute the instructions thereby implementing:
an input circuit which inputs image data of a correction target;
a pixel value relationship extraction circuit which extracts a relationship of pixel values among adjacent pixels from the image data of the correction target;
a pixel value relational expression estimation circuit which estimates a relational expression representing a characteristic difference at each pixel from the relationship of the pixel values among the adjacent pixels;
a pixel value correction circuit which generates a correction image by correcting pixel values of the image data of the correction target using the relational expression; and
an output circuit which outputs the correction image.

2. The image correction system according to claim 1, wherein the image data is formed by a plurality of pixels arranged in an array,
odd pixels located in odd-numbered rows have different characteristics from even pixels located in even-numbered rows, and
the pixel value relationship extraction circuit extracts the relationship of the pixel values among the adjacent pixels with respect to the odd pixels and the even pixels which are adjacent.

3. The image correction system according to claim 2, wherein the pixel value correction circuit
converts all pixel values which belong to either of the odd pixels or the even pixels by the relational expression and
corrects the image data by combining pixel values which are not converted among the odd pixels and the even pixels with pixel values converted by the relational expression.

4. The image correction system according to claim 2, wherein the pixel value relational expression estimation circuit obtains a coefficient $a_j$ which minimizes energy expressed by a following expression and $$E = \sum_i \left\{ ve_i - \sum_j a_j vo_i^j \right\}^2$$

where
E: energy
i: a set number of an odd pixel and an even pixel
$ve_i$: a pixel value of an even pixel in a set of a set number i of an even pixel and an odd pixel
$vo_i$: a pixel value of the odd pixel in a set of a set number i of an even pixel and an odd pixel
$a_j$: coefficient
j: degree
estimates as the relational expression an expression obtained by substituting the coefficient $a_j$ for a following expression, $$ve = \sum_j a_j vo^j$$

where
ve: a pixel value of an even pixel
vo: a pixel value of an odd pixel
$a_j$: coefficient
j: degree.

5. The image correction system according to claim 1, wherein
the image correction system comprises a representative pixel value relationship extraction circuit which extracts a relationship of representative pixel values among the relationships of the pixel values extracted by the pixel value relationship extraction circuit and
the pixel value relational expression estimation circuit estimates the relational expression based on the relationship of the representative pixel values.

6. The image correction system according to claim 5, wherein the representative pixel value relationship extraction circuit
sets the representative pixel values at a predetermined interval in a row or a column to which the odd pixels or the even pixels belong and sets the relationship of the representative pixel value for each of the representative pixel values.

7. The image correction system according to claim 5, wherein
the image correction system comprises a pixel value relationship histogram generation circuit which generates a histogram of the relationship of the pixel values extracted by the pixel value relationship extraction circuit and
the representative pixel value relationship extraction circuit extracts the representative pixel values using the histogram.

8. The image correction system according to claim 7, wherein the pixel value relationship histogram generation circuit
generates the histogram by voting the relationship of the pixel values among the adjacent pixels extracted by the pixel value relationship extraction circuit in a coordinate plane whose coordinate axes are the pixel value of the odd pixel and the pixel value of the even pixel.

9. An image correction method of correcting image data from pixels connected to at least two different input paths, comprising:
- inputting, with one or more input interfaces, image data of a correction target from pixels connected to at least two different-input paths;
- extracting, with one or more processors, a relationship of pixel values among adjacent pixels from the image data of the correction target;
- estimating, with one or more processors, a relational expression representing a characteristic difference at each pixel from the relationship of the pixel values among the adjacent pixels;
- generating, with one or more processors, a correction image by correcting the pixel values of the image data of the correction target using the relational expression; and
- outputting, with one or more output interfaces, the correction image.

10. A non-transitory computer readable medium for recording an image correction program for correcting image data from pixels connected to at least two different input paths, the image correction program causing a computer to execute:
- a process for inputting image data of a correction target;
- a process for extracting a relationship of pixel values among adjacent pixels from the image data of the correction target;
- a process for estimating a relational expression representing a characteristic difference at each pixel from the relationship of the pixel values among the adjacent pixels;
- a process for generating a correction image by correcting the pixel values of the image data of the correction target using the relational expression; and a process for outputting the correction image.

* * * * *